Feb. 14, 1939.  A. L. BERGER  2,146,717
TRANSMISSION MECHANISM
Original Filed April 1, 1933
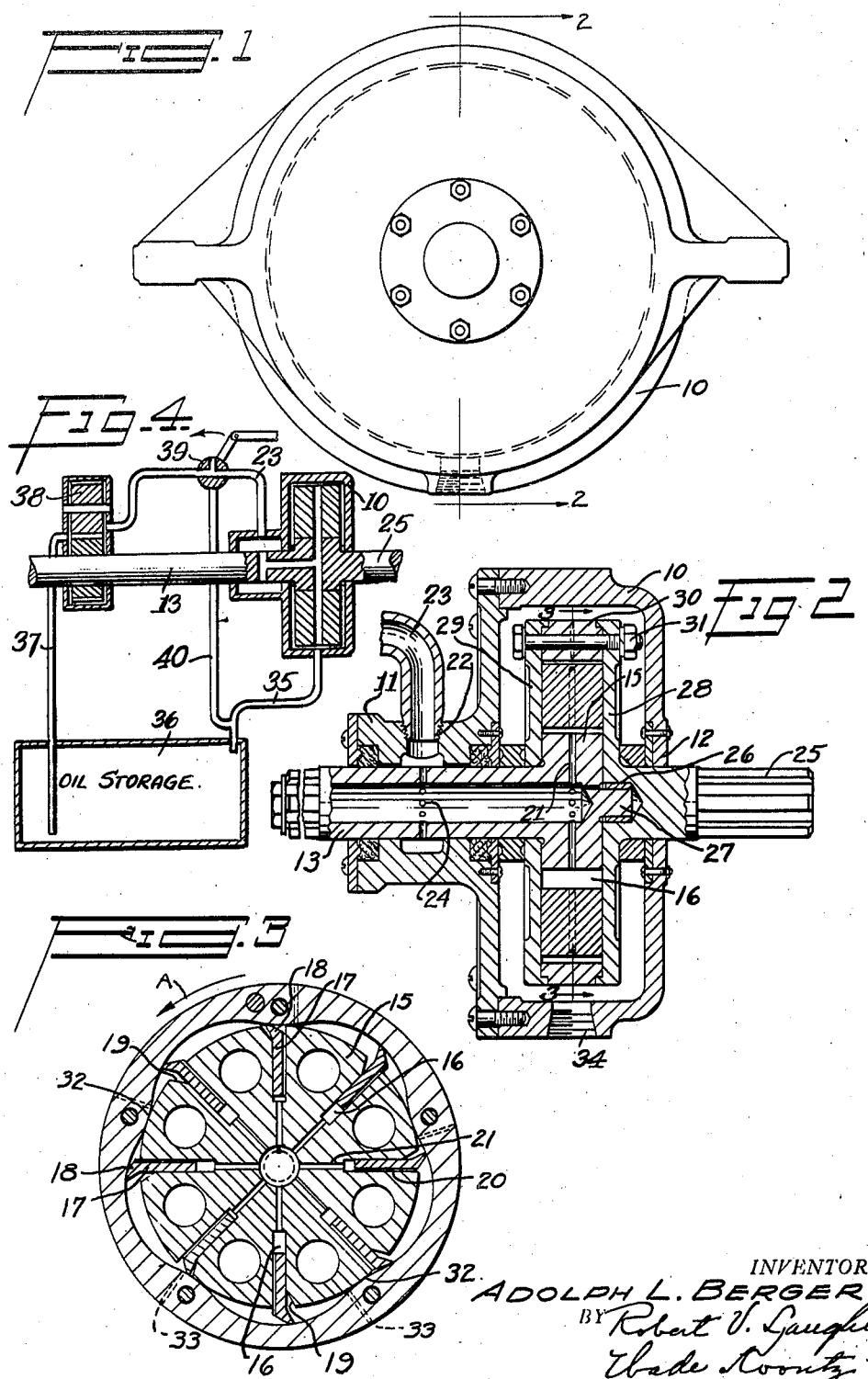
INVENTOR
ADOLPH L. BERGER Patented Feb. 14, 1939

2,146,717

UNITED STATES PATENT OFFICE 2,146,717

TRANSMISSION MECHANISM

Adolph L. Berger, Dayton, Ohio

Original application April 1, 1933, Serial No. 663,951. Divided and this application February 12, 1936, Serial No. 63,586

11 Claims. (Cl. 192—58)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to transmissions capable of use in automobiles, aircraft or other vehicles and more particularly to improved means for regulating and controlling the speed of a supercharger to compensate for changes in atmospheric pressure. The present invention is a division of my copending application Serial No. 663,951, filed by myself in the United States Patent Office April 1, 1933.

The primary object of the present invention is to provide means whereby the speed of the transmission may be made variable in desired degrees of the driven element with respect to a constantly operated driving element.

A further object of this invention is to provide a transmission mechanism capable of infinite speed ratio, and one wherein such speed ratio may be automatically adjusted to the operating requirements.

A still further object of the present invention is to provide in a transmission mechanism of this character an arrangement of parts which makes unnecessary the use of gearing, or the like, friction clutches, or friction discs as a driving medium between the prime mover and the driven member.

A still further object of the present invention is to provide a transmission mechanism in which the flow of a fluid is used as the driving medium between the driven and the driving member.

A further object of the present invention is to provide a transmission mechanism in which sliding contact is obtained between the moving parts thereby reducing to a minimum the possible wear of the component parts in service operation.

A still further object of the present invention is the provision of a device of this character which may be cheaply constructed, readily assembled and installed and which may be operated with a minimum expenditure of power.

The invention may be embodied to comprehend a mechanism in which some of the elements operate relative to the others and relatively to an enclosing structure to accomplish transmission of water, oil, or other fluid medium therethrough and to impel the same with a force dependent entirely upon the relative speed of the operating parts.

With the above and other objects in view, the invention has particular relation to certain novel features of construction, operation and arrangement of parts, an example of which is given in this specification and illustrated in the accompanying drawing wherein:

Fig. 1 is an end view of a present preferred embodiment of my invention;

Fig. 2 is a sectional view taken on the line 2—2 of Fig. 1; and

Fig. 3 is a sectional view taken on the line 3—3 of Fig. 2.

Fig. 4 is a diagrammatic view illustrating the manner of operation and method of control of the invention.

Referring more particularly to the drawing wherein corresponding parts are designated by like numerals throughout the several views, the transmission mechanism, which may be compared to a variable clutch mechanism or the like, comprises generally a fixed housing 10 provided on its one side with an enlarged bearing portion 11 and on its opposite side with a second bearing portion designated by the numeral 12. The numeral 13 designates a hollow shaft which is journaled in the bearing portion 11 and which extends into the housing 10, as shown in Fig. 2. A cap screw 14 or the like may be used to close the outer open end of the shaft 13. A circular disc, indicated by the numeral 15, of substantial thickness is integrally formed on the inner end of the shaft 13 near its center. This disc, which is located inside the limits of the housing 10, has a plurality of evenly spaced apart, radially extending slots 16 formed in the outer portion of its periphery. The numeral 17 designates a vane which is slidably mounted in each of the slots 16, as shown in Fig. 3. These vanes have a width similar to the width of the rotor or disc 15 and each has an engaging pointed head 18 which extends outwardly and forwardly in the direction of rotation of the disc 15. The numeral 19 designates a cut-away portion in the periphery of the disc 15 adjacent each of the slots 16 to accommodate the head 18 when the vanes are moved to their extreme inward movement when sliding toward the center of the disc 15.

The numeral 20 designates a passageway extending completely through and parallel to the longitudinal axis of each of the vanes 17. The outlet of each of these passageways is immediately rearward of a head 28. The numeral 21 designates passageways in the disc 15 which connects at the bottom of each slot 16 with the inside of the shaft 13. The bearing portion 11, heretoforementioned, is provided with a transversely extending threaded opening 22 which is adapted for communication with and is sealed at its outer end by a liquid pipe 23, the latter being adapted for connection with a source of variable fluid pressure. The numeral 24 designates a plurality of radial passageways which are formed in the shaft 13, each passageway being adapted for communication with the inside of the said shaft and with the pipe 23 heretoforementioned. By means of this construction, oil or other fluid medium may pass from the pipe 23 into the interior of the shaft 13. From the pipe 23 the fluid passes through the passageways 21, heretoforementioned, into the bottom of the slot 16 and then through the passageways 20 toward the periphery of the disc 15 rearwardly of the heads 18. The numeral 25 designates a driven shaft that is journaled in the bearing portion 12 heretoforementioned and which extends into the housing 10. This shaft is provided at its inner end with a bearing portion 26 which centers on and is supported by a lug 27 formed on the inner end of the disc 15. A plate, indicated by the numeral 28, is integrally formed on the inner end portion of the shaft 25. This plate is disposed within the inner limits of the housing 10 in the manner illustrated in Fig. 2. A second plate, indicated by the numeral 29, is rotatably mounted on the shaft 13 and opposes the plate 28 mentioned above. The two plates 28 and 29 are positioned on each side of the rotor or disc 15 and constitute side walls for said disc. The numeral 30 designates a ring which loosely embraces the rotor or disc 15 and is positioned intermediate the plates 28 and 29. This ring is rigidly secured to the plates 28 and 29 by a plurality of radially disposed bolts 31 and forms with said plates a housing for the disc 15. The numeral 32 designates a plurality of equally spaced-apart, raised or camming portions which are formed on the inner surface of the ring 30. Each camming portion extends inwardly an amount sufficient to contact with the periphery of the disc 15. When the shaft 13, which obviously may be operatively connected to the crankshaft of an internal combustion engine or any other source of motive power, is rotated, the vanes 17 will be moved outwardly by centrifugal force and the heads 18 slidably engage and move along the inner surface of the ring 30. The numeral 33 designates a plurality of passageways which pass through the ring 29. Each of said passageways are positioned immediately forward of one of the camming portions 32 heretoforementioned.

When the disc 15 is rotated in the direction of the arrow A shown in Fig. 3 and fluid is being forced into the shaft 13 from its source of supply, the incoming fluid will pass through the passageways 20 and into the space formed between the periphery of the disc and the ring 30 heretoforementioned and between the camming portions of the ring. Inasmuch as the vanes are yieldingly held outwardly in their sliding movements, said vanes will engage the fluid between the disc 15 and the ring and force it outwardly with respect to the passageways 33 before the vanes reach and are moved inwardly caused by engagement with the camming portion heretoforementioned. As shown in Fig. 2, the housing 10 is provided with an outlet 34 to which is operatively connected a return line 35 leading to the source of fluid supply. Obviously, the forcing of the fluid through the passageways 33, mentioned above, will create considerable resistance with the result that the ring 30 will tend to rotate with the disc 15, thereby rotating the driven shaft 25, and, in turn, rotating the part to which this shaft may be operatively connected. The amount of the resistance set up will be directly proportional to the amount of liquid being forced into the hollow shaft 13; consequently, when only a small amount of liquid enters the shaft 13, the passage of this liquid through the ports 33 heretoforementioned will be comparatively easy, with the ring 30 yieldingly held from rotation by the power necessary to operate the part to which the shaft 24 is operatively connected. On the other hand, with the increasing of the pressure of the liquid entering the shaft 13, the speed of rotation of the ring 30 will accordingly increase until it approaches the speed of rotation of the disc 15. Obviously, the ultimate speed to be obtained by the driven shaft 24 is dependent entirely upon the prime mover or driving shaft 13 and as long as the speed of the prime mover remains constant, at no time will the speed of the driven shaft be greater than the speed of the prime mover. If, however, the speed of rotation of the driving shaft is increased, a proportional increase in the speed of the driven shaft can be obtained and thereby provide a transmission which is capable of infinite speed ratio, and thus is accomplished one of the primary objects of this invention.

Inasmuch as the fluid under pressure enters at the bottom of the slots heretoforementioned and below the vane, the vanes 17, in addition to being forced outwardly by centrifugal force, will also be forced outwardly by the pressure of the fluid, which force will increase with the increased pressure of the fluid.

Fig. 4 diagrammatically illustrates an arrangement for controlling the speed of rotation of the driven member. This arrangement shows a storage tank 36 from which fluid is supplied to the housing 10 by means of a pump 38. This pumping unit is suitably connected to the drive shaft 13 to be driven thereby and is communicatively connected to the tank 36 at the bottom thereof through a conduit 37. The output side of this pumping unit is communicatively connected with the housing 10 through the conduit 23 and to the storage tank through conduit 40, there being provided between said pumping unit and said conduits a two-way valve 39 which may be operated either manually or by a pressure regulator of the type shown in Patent No. 2,024,202 issued to me on December 17, 1935, to control the flow of fluid through the conduit 23 or by-pass the same to the storage tank through conduit 40. It will be seen that, if the driving shaft 13 is rotated at a given speed and the valve 39 partially opened a predetermined amount to establish a certain rate of flow of the fluid through conduit 23 and the ports 33, there will be obtained a proportional velocity of the driven shaft 25. If, however, the valve 39 is in the full open position as shown in Fig. 4, a greater flow of fluid through the ports 33 obtains and the speed of rotation of the driven shaft will be increased. Conversely, if the valve 39 is fully closed to shut off the flow through the conduit 23, no fluid will flow through the ports 33 and the driven shaft will not rotate. In this position of the valve, communication is established between the pumping unit 38 and the storage tank through conduit 40.

Obviously, the device hereinabove described may, in many instances, be mounted in or formed as an integral part of an engine crankcase. With such an arrangement the housing 10 may be obviously dispensed with.

It is thought that the invention and many of its attending advantages will be understood from the foregoing description, and it will be apparent that various changes may be made in the form, construction, and arrangement of the several parts without departing from the spirit and scope of the invention or in sacrificing any of its material advantages, the form hereinbefore described being merely a present preferred embodiment of my invention.

What I claim as new and desire to secure by Letters Patent is:

1. In a device of the class described, a rotating driving member, a rotatable driven member, a disc carried by said driving member, a housing carried by said driven member and enclosing said disc, said disc and housing being so constructed and arranged as to provide between their adjacent peripheral surfaces a plurality of spaced chambers, a fluid passageway extending through said disc and driving member having communication with a source of fluid pressure supply for supplying fluid under pressure into said chambers, a plurality of impellers carried by said disc and adapted to operate in said chambers upon rotation of said disc and create a current flow of the fluid in said chambers, and an outlet orifice associated with each chamber for restricting the current flow of said fluid, the retarding action of said current flow operating to move said housing in the direction of said fluid current and thereby obtain a movement of said driven member.

2. In a device of the class described, a rotatably mounted hollow shaft designed to be in communication with a source of fluid pressure, a disc rigidly secured to said shaft, a housing loosely embracing said disc, a second rotatably mounted shaft secured to and supporting said housing, raised portions inside said housing, radial slots in said disc, a vane slidably mounted in each of said slots and capable of slidably engaging the inside of said housing and said raised portions, fluid passageways through said housing, and fluid passageways communicating with the inside of said hollow shaft and the periphery of said disc.

3. In a device of the class described, a rotatably mounted hollow shaft designed to be in communication with a fluid under varying pressures, an element secured to said shaft, a slot in said element, a second shaft, a housing secured to said second shaft and loosely embracing said element, a raised portion inside said housing, a vane slidably mounted in said slot capable of slidably engaging the inside of said housing and said raised portion, a fluid passageway extending through said housing and a fluid passageway having one end communicating with the inside of said hollow shaft and its other end communicating with the space between said element and said housing.

4. In a device of the class described, a rotatably mounted hollow shaft designed to be in communication with a fluid under varying pressures, an element secured to said shaft, a slot in said element, a second shaft, a housing secured to said second shaft and loosely embracing said element, a raised portion inside said housing, a vane slidably mounted in said slot capable of slidably engaging the inside of said housing and said raised portion respectively, a fluid passageway extending through said housing at a point in advance of said raised portion, and a fluid passageway having one end communicating with the inside of said hollow shaft and its other end communicating with the space between said element and said housing at a point rearward of said vane.

5. In a device of the class described, a rotatably mounted hollow shaft to be driven and designed to be in communication with a source of fluid under pressure, a disc member secured to said shaft, a second rotatably mounted shaft, a housing secured to said second shaft and loosely embracing said disc member, a plurality of evenly spaced apart, raised portions on the inside of said housing, a plurality of evenly spaced apart, radially extending slots in the outer portion of said disc member, a vane slidably mounted in each of said slots capable of slidably engaging the inside of said housing and said raised portions when said hollow shaft is rotated, a passageway in advance of each of said portions and extending through said housing, a passageway communicating with each of said slots and the inside of said hollow shaft, and a second passageway extending completely through each of said vanes.

6. In a device of the class described, a rotatably mounted hollow shaft to be driven and designed to be in communication with a source of fluid under pressure, a disc member secured to said shaft, a second rotatably mounted shaft, a housing secured to said second shaft and loosely embracing said disc member, a plurality of evenly spaced apart, raised portions on the inside of said housing, a plurality of similarly arranged radially extending slots in the outer portion of said disc member, a vane slidably mounted in each of said slots capable of slidably engaging the inside of said housing and said raised portions when said hollow shaft is rotated, a passageway in advance of each of said portions and extending through said housing, a second passageway communicating with each of said slots and the inside of said hollow shaft, and a passageway extending completely longitudinally through each of said vanes and located in the rear side portions of said vanes.

7. In a device of the class described, a rotatably mounted hollow shaft designed to be in communication with a fluid under varying pressures, an element secured to said shaft, a slot in said element, a second shaft, a housing secured to said second shaft and loosely embracing said element, a raised portion inside of said housing, a vane slidably mounted in said slot, a pointed head member formed on the outer end of said vane extending outwardly and forwardly and capable of slidably engaging the inside of said housing and said raised portions, a fluid passageway extending through said housing at a point in close proximity to said raised portions, a passageway having one end communicating with the bottom of said slot and the inside of said hollow shaft, and a passageway extending longitudinally through said vane and located to the rear of the pointed end of said head.

8. In a device of the class described, a rotatably mounted hollow shaft designed to be in communication with a fluid under varying pressures, an element secured to said shaft, a slot in said element, a second shaft, a housing secured to said second shaft and loosely embracing said element, a raised portion inside said housing, a vane slidably mounted in said slot, a pointed head member formed on the outer end of said vane extending outwardly and forwardly and capable of slidably engaging the inside of said housing and said raised portion, a fluid passageway extending through said housing at a point in close proximity to said raised portion, a passageway having one end communicating with the bottom of said slot and the inside of said hollow shaft, a passageway extending longitudinally through said vane and located to the rear of the pointed end of said head, and a cut-away portion in said element to provide a space for said head when said vane is moved to an extreme inward position with respect to said element.

9. In combination with a driving member, a driven member and fluid impelling means for displacing fluid to drivingly connect said driving and driven members comprising a working chamber having a fluid inlet and a fluid outlet and an impeller operative in response to the movement of said driving member and capable of relative movement with respect to said working chamber for resistably displacing fluid through said outlet, means for supplying fluid to said working chamber to obtain a predetermined ratio between the speed of said driving member and the speed of said driven member as a function of the quantity of fluid supplied to said chamber.

10. In combination with a driving member, a driven member and fluid impelling means for displacing fluid to drivingly connect said driving and driven members comprising a working chamber having a fluid inlet and a fluid outlet and an impeller operative in response to the movement of said driving member and capable of relative movement with respect to said working chamber for resistably displacing fluid through said outlet, means actuated by said driving member for supplying fluid to said working chamber to obtain a predetermined ratio between the speed of said driving member and the speed of said driven member as a function of the quantity of fluid supplied to said chamber.

11. In combination with a driving member, a driven member and fluid impelling means for displacing fluid to drivingly connect said driving and driven members comprising a working chamber having a fluid inlet and a fluid outlet and an impeller operative in response to the movement of said driving member and capable of relative movement with respect to said working chamber for resistably displacing fluid through said outlet, of variable means for supplying fluid to said working chamber to vary the ratio between the speeds of said driving and driven members as a function of a change in the quantity of fluid supplied to said chamber.

ADOLPH L. BERGER.